US012662582B2

(12) United States Patent
Shih

(10) Patent No.:  US 12,662,582 B2
(45) Date of Patent:     Jun. 23, 2026

(54) METHOD FOR MAKING FAUX WOOD MATERIAL WITH MULTILAYER PATTERN EFFECT AND MIXED PLASTIC MATERIAL FOR USE IN THE METHOD

(71) Applicant: TAIWAN SUSTAINABLE MATERIAL TECHNOLOGY CO., LTD., Kaohsiung City (TW)

(72) Inventor: Ruey-Sheny Shih, Kaohsiung City (TW)

(73) Assignee: TAIWAN SUSTAINABLE MATERIAL TECHNOLOGY CO., LTD., Kaohsiung City (TW)

( * ) Notice: Subject to any disclaimer, the term of this patent is extended or adjusted under 35 U.S.C. 154(b) by 125 days.

(21) Appl. No.: 18/544,352

(22) Filed: Dec. 18, 2023

(65) Prior Publication Data

US 2024/0218143 A1     Jul. 4, 2024

(30) Foreign Application Priority Data

Dec. 30, 2022    (TW) .................................. 111150988

(51) Int. Cl.
C08J 9/10           (2006.01)
B29D 7/00           (2006.01)
                                (Continued)

(52) U.S. Cl.
CPC ................ C08J 9/102 (2013.01); B29D 7/00 (2013.01); B32B 5/18 (2013.01); B32B 5/32 (2013.01); B32B 7/023 (2019.01); C08L 9/06 (2013.01); C08L 23/06 (2013.01); C08L 25/06 (2013.01); C08L 25/12 (2013.01); C08L 31/04 (2013.01); B29K 2105/0026 (2013.01);
                                (Continued)

(58) Field of Classification Search
CPC .............. B32B 5/18; B32B 5/32; B32B 5/065
See application file for complete search history.

(56) References Cited

U.S. PATENT DOCUMENTS

2005/0282920 A1* 12/2005 Wu .......................... B29C 44/06
                                                                                    521/54
2007/0256379 A1* 11/2007 Edwards ............... B32B 21/047
                                                                                    52/309.9

FOREIGN PATENT DOCUMENTS

TW             I321097  B        3/2010
TW             201024081 A        7/2010

OTHER PUBLICATIONS

Shi (Machine Translation of TW201024081A) (Year: 2010).*

* cited by examiner

*Primary Examiner* — Michael A Tolin
*Assistant Examiner* — Hana C Page

(57)                    ABSTRACT

A method for making a faux wood material with a multilayer pattern effect and a mixed plastic material for use in the method involve: performing a compounding process on a thermoplastic elastomer material, a hard-segment-structure material and a foaming agent to form the mixed plastic material; performing through an extruder a first foaming process on the mixed plastic material to form a preliminary sheet having a density equal to 10% to 20% of the density of the mixed plastic material and a thickness of 1-4 mm; stacking preliminary sheets up; and performing through a hot-pressing mold a second foaming process on the stacked preliminary sheets to form the faux wood material having a density equal to 40%-50% of the density of the mixed plastic material. Accordingly, through the two foaming processes, a multilayer pattern effect can be presented on the faux wood material due to its density difference.

15 Claims, 3 Drawing Sheets

(51) Int. Cl.

| | |
|---|---|
| *B32B 5/18* | (2006.01) |
| *B32B 5/32* | (2006.01) |
| *B32B 7/023* | (2019.01) |
| *C08L 9/06* | (2006.01) |
| *C08L 23/06* | (2006.01) |
| *C08L 25/06* | (2006.01) |
| *C08L 25/12* | (2006.01) |
| *C08L 31/04* | (2006.01) |
| *B29K 105/00* | (2006.01) |
| *B29K 105/04* | (2006.01) |

(52) U.S. Cl.
CPC .. *B29K 2105/0032* (2013.01); *B29K 2105/04* (2013.01); *B32B 2266/0214* (2013.01); *B32B 2307/3065* (2013.01); *B32B 2307/4026* (2013.01); *B32B 2307/7376* (2023.05); *C08J 2203/02* (2013.01); *C08J 2203/04* (2013.01); *C08J 2309/06* (2013.01); *C08J 2323/06* (2013.01); *C08J 2325/06* (2013.01); *C08J 2325/12* (2013.01); *C08J 2331/04* (2013.01); *C08J 2353/02* (2013.01); *C08J 2409/06* (2013.01); *C08J 2423/06* (2013.01); *C08J 2425/06* (2013.01); *C08J 2425/12* (2013.01); *C08J 2453/02* (2013.01)

Start

Performing a compounding process to form a mixed plastic material. ～101

Performing a first foaming process to form a preliminary sheet. ～102

Stacking a plurality of preliminary sheets up. ～103

Performing a second foaming process to form a faux wood material. ～104

End

METHOD FOR MAKING FAUX WOOD MATERIAL WITH MULTILAYER PATTERN EFFECT AND MIXED PLASTIC MATERIAL FOR USE IN THE METHOD

CROSS-REFERENCE TO RELATED PATENT APPLICATION

This non-provisional application claims priority to and the benefit of, under 35 U.S.C. § 119(a), Taiwan Patent Application No. 111150988, filed Dec. 30, 2022 in Taiwan. The entire content of the above identified application is incorporated herein by reference.

FIELD

The present disclosure relates to a method for making a faux wood material and a mixed plastic material for use in the method, and more particularly to a method and a mixed plastic material that can naturally form a multilayer pattern effect on a faux wood material through a first foaming process and a second foaming process.

BACKGROUND

Conventional composite wood materials generally use formaldehyde-based adhesives and therefore tend to produce free formaldehyde while in use, which raises concerns. In view of this, many manufacturers have mixed wood materials into plastic to produce wood-plastic composites (WPCs), so as to reduce the release of formaldehyde and improve such material properties as dimensional stability. Compared with plastic, WPCs have a better antistatic effect and higher elasticity. Compared with wood, WPCs have higher dimensional stability, higher resistance to insects and corrosion, and higher weather resistance.

However, using wood fiber (or wood powder) as a reinforcing agent or filler in plastic still has its problems. One major problem is that the formation of chemical bonds between plastic and wood fiber is often hindered by the difference between their surface polarities. Also, wood fiber is poorly dispersed in plastic because of the hydrogen bonds between fiber molecules.

In view of the above, and to solve the aforesaid problems, the inventor of the present invention previously developed a faux wood material different from that in the present disclosure, and found through actual use of this previously developed faux wood material that if an end product (e.g., a plank, fence, exterior wall panel, window frame, or roofing material) made of the faux wood material is desired to have a bicolor appearance, it is required to provide the faux wood material with a multilayer pattern effect in the first place by stacking and processing sheets of constituent materials of at least two colors, and that the manufacturing process of such a faux wood material is complicated and time-consuming. One of the issues to be addressed in the present disclosure is to find an effective solution to the foregoing problems and provide a new method for making a faux wood material having a multilayer pattern effect.

SUMMARY

As a result of longtime research and experiment, a method for making a faux wood material with a multilayer pattern effect and a mixed plastic material for use in the method are provided in the present disclosure, so as to provide a faux wood material that naturally forms a multilayer pattern effect.

Certain aspects of the present disclosure are directed to a method for making a faux wood material with a multilayer pattern effect. The method includes: performing a compounding process on a thermoplastic elastomer material, a hard-segment-structure material and a foaming agent to form a mixed plastic material; performing, through an extruder, a first foaming process on the mixed plastic material to form a preliminary sheet having a density equal to 10% to 20% of a density of the mixed plastic material and a thickness of 1-4 mm; stacking a plurality of preliminary sheets including the preliminary sheet up; performing, through a hot-pressing mold, a second foaming process on the stacked preliminary sheets to form the faux wood material having a density equal to 40%-50% of the density of the mixed plastic material. As the density of two outer sides of each of the preliminary sheets is different from a density of an inner area of such a preliminary sheet, the faux wood material has a multilayer pattern differing in darkness and lightness. Accordingly, the method according to the present disclosure enables the preliminary sheets to naturally form two colors that differ in darkness/lightness through foaming density difference, and the preliminary sheets are stacked up and foamed under a high temperature and high pressure, so as to produce a multilayer pattern effect on the faux wood material.

In certain embodiments, the thermoplastic elastomer material used in the method includes at least one of polyethylene, an ethylene-vinyl acetate copolymer, a styrene-butadiene-styrene block copolymer, a styrene-isoprene-styrene block copolymer, and a styrene-based block copolymer.

In certain embodiments, the hard-segment-structure material used in the method includes at least one of polystyrene, a styrene-acrylonitrile copolymer, an acrylonitrile-butadiene-styrene copolymer, and high-impact polystyrene.

In certain embodiments, the thermoplastic elastomer material used in the method constitutes 10% to 90% by weight of the mixed plastic material, the foaming agent used in the method constitutes 0.1% to 15% by weight of the mixed plastic material, and the hard-segment-structure material used in the method makes up the remaining percentage by weight of the mixed plastic material.

In certain embodiments, the foaming agent used in the method is an azo-type chemical foaming agent.

In certain embodiments, the foaming agent used in the method is a physical foaming agent.

In certain embodiments, an extrusion temperature of the first foaming process is a decomposition temperature of the foaming agent.

In certain embodiments, the second foaming process has a heating temperature of 160-180° C., a pressing pressure of 100-200 kg/cm$^2$, and a foaming time of 10-30 minutes.

In certain embodiments, the mixed plastic material used in the method further includes bridging agent.

In certain embodiments, the bridging agent used in the method constitutes 0.01% to 2% by weight of the mixed plastic material.

In certain embodiments, the bridging agent used in the method is dicumyl peroxide, 2,5-(tert-butylperoxy)-2,5-dimethylhexane, or sulfur.

In certain embodiments, the mixed plastic material used in the method further includes a coloring material.

In certain embodiments, the mixed plastic material used in the method further includes a fire retardant.

In certain embodiments, the mixed plastic material used in the method further includes a blowing promoter that constitutes 0.1% to 10% by weight of the mixed plastic material.

In certain embodiments, the blowing promoter used in the method is zinc stearate or zinc oxide.

Certain aspects of the present disclosure are directed to a mixed plastic material for forming a faux wood material with a multilayer pattern effect. The mixed plastic material includes: a thermoplastic elastomer material constituting 10% to 90% by weight of the mixed plastic material; a foaming agent constituting 0.1% to 15% by weight of the mixed plastic material; and a hard-segment-structure material.

In certain embodiments, the mixed plastic material further includes a bridging agent constituting 0.01% to 2% by weight of the mixed plastic material.

In certain embodiments, the bridging agent is dicumyl peroxide, 2,5-(tert-butylperoxy)-2,5-dimethylhexane, or sulfur.

In certain embodiments, the mixed plastic material further includes a blowing promoter that constitutes 0.10% to 10% by weight of the mixed plastic material.

In certain embodiments, the blowing promoter is zinc stearate or zinc oxide.

In certain embodiments, the thermoplastic elastomer material includes at least one of polyethylene, an ethylene-vinyl acetate copolymer, a styrene-butadiene-styrene block copolymer, a styrene-isoprene-styrene block copolymer, and a styrene-based block copolymer.

In certain embodiments, the hard-segment-structure material includes at least one of polystyrene, a styrene-acrylonitrile copolymer, an aciylonitrile-butadiene-styrene copolymer, and high-impact polystyrene.

In certain embodiments, the mixed plastic material further includes a coloring material.

In certain embodiments, the mixed plastic material further includes a fire retardant.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION

Figure 1:
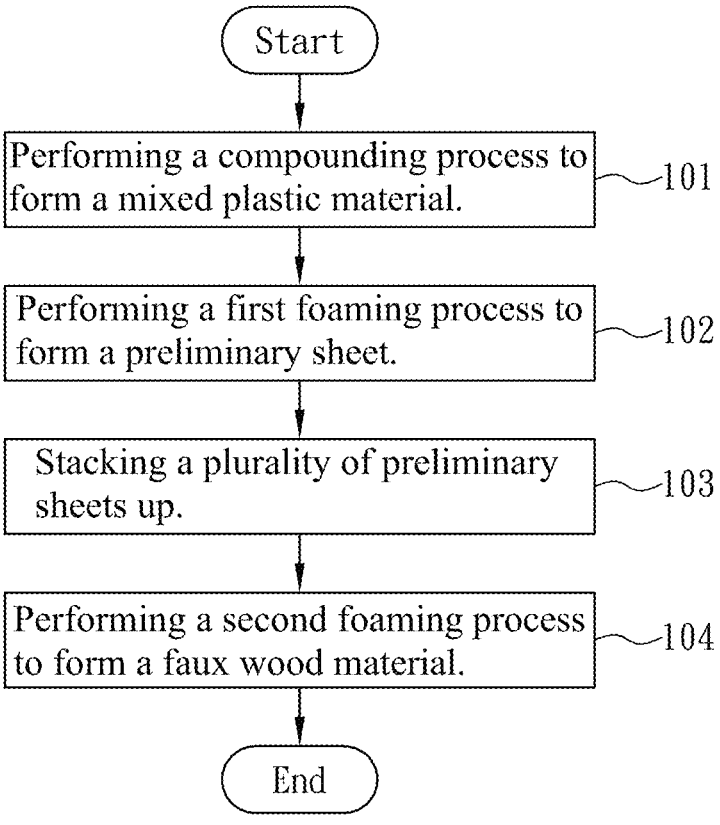
FIG. 1 is a flowchart of the method according to certain embodiments in the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The accompanying drawings are schematic and may not have been drawn to scale. The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, materials, objects, or the like, which are for distinguishing one component/material/object from another one only, and are not intended to, nor should be construed to impose any substantive limitations on the components, materials, objects, or the like. Directional terms (e.g., "front", "rear", "left", "right", "upper/top" and/or "lower/bottom") are explanatory only and are not intended to be restrictive of the scope of the present disclosure.

As may be used herein, the term "substantially" refers to, for example, a value, or an average of values, in an acceptable deviation range of a particular value recognized or decided by a person of ordinary skill in the art, taking into account any specific quantity of errors related to the measurement of the value that may resulted from limitations of a measurement system or device. For example, "substantially" may indicate that the value is within, for example, ±5%, ±3%, ±1%, ±0.5% or ±0.1%, or one or more standard deviations, of the particular value.

Certain aspects of the present disclosure are directed to a method for making a faux wood material with a multilayer pattern effect and a mixed plastic material for use in the method, which enable the faux wood material with both dark and light colors to be made of the mixed plastic material of a single color, and simulate the wood properties and multilayer grain patterns of real wood. In certain embodiments, referring to FIG. 1, the method for making the faux wood material includes the following steps:

Step (101): A composite material formed by a thermoplastic elastomer material and a hard-segment-structure material goes through a compounding process together with a foaming agent in order for the composite material and the foaming agent to form a mixed plastic material. The thermoplastic elastomer material can constitute 10% to 90% by weight of the mixed plastic material, and the foaming agent can constitute 0.1% to 15% by weight of the mixed plastic material, with the hard-segment-structure material making up, for example but not limited to, the remaining percentage by weight of the mixed plastic material. If the mixed plastic material includes another ingredient, the percentage by weight of the hard-segment-structure material will be changed accordingly. In certain embodiments, the mixed plastic material can further include a bridging agent that constitutes 0.01% to 2% by weight of the mixed plastic material. In certain embodiments, the mixed plastic material can include a coloring material (e.g., a color masterbatch)

and/or a fire retardant in order for the end product to have the color and/or effect desired by the manufacturer. In certain embodiments, the mixed plastic material can include a blowing promoter that constitutes 0.1% to 10% by weight of the mixed plastic material to facilitate decomposition of the foaming agent and increase foaming efficiency. In any of the foregoing cases, the percentage by weight of the hard-segment-structure material will be reduced according to the percentage(s) by weight of the additional material(s).

Based on actual product requirements and manufacturing process requirements, the thermoplastic elastomer material can be of polymer compounds, and can include at least one of polyethylene (PE), an ethylene-vinyl acetate (EVA) copolymer, a styrene-butadiene-styrene (SBS) block copolymer, a styrene-isoprene-styrene block copolymer, and a styrene-based block copolymer; the hard-segment-structure material can be of polymer compounds, and can include at least one of polystyrene (PS), a styrene-acrylonitrile (SAN) copolymer, an acrylonitrile-butadiene-styrene (ABS) copolymer, and high-impact polystyrene (HIPS); the foaming agent can be a chemical foaming agent (e.g., an azo-type chemical foaming agent) or a physical foaming agent (e.g., sodium bicarbonate); the bridging agent can be dicumyl peroxide, 2,5-(tert-butylperoxy)-2,5-dimethylhexane, or sulfur; and the blowing promoter can be, but is not limited to, zinc stearate or zinc oxide. Moreover, the present disclosure is not limited to the thermoplastic elastomer material and the hard-segment-structure material forming a composite material before going through the compounding process together with the foaming agent, as the individual ingredients (i.e., the thermoplastic elastomer material, the hard-segment-structure material, and the foaming agent) can also be added into the compounding machine one by one, as long as those ingredients can form the desired mixed plastic material.

Step (102): An extruder is used to perform a first foaming process (also referred to as a foam extrusion process or a microcellular foaming process) on the mixed plastic material. In certain embodiments, the extrusion temperature of the first foaming process is the decomposition temperature of the foaming agent, such as but not limited to a temperature in the range from 160° C. to 180° C. The duration of the first foaming process depends on the extrusion speed and extrusion pressure, both of which can be adjusted according to the type of the extruder and product requirements in order to change the foamed state of the mixed plastic material. The foam resulting from this step (i.e., the mixed plastic material in an expanded state) can have a density equal to 10% to 20% of the density of the mixed plastic material and a thickness of 1-4 mm so as to form a preliminary sheet.

Step (103): A plurality of preliminary sheets are stacked up according to a required product thickness.

Step (104): A hot-pressing mold is used to perform a second foaming process on the stack of preliminary sheets. In certain embodiments, the second foaming process uses a heating temperature of 160-180° C. and a pressing pressure of 100-200 kg/cm² , and the foaming time is 10-30 minutes. The parameters of the second foaming process, however, are not limited to those stated above. In certain embodiments, the parameters of the second foaming process can be adjusted according to product requirements. The foam resulting from this step (i.e., the stack of preliminary sheets in an expanded state) can have a density equal to 40%-50% of the density of the mixed plastic material so as to form a faux wood material.

Figure 2:
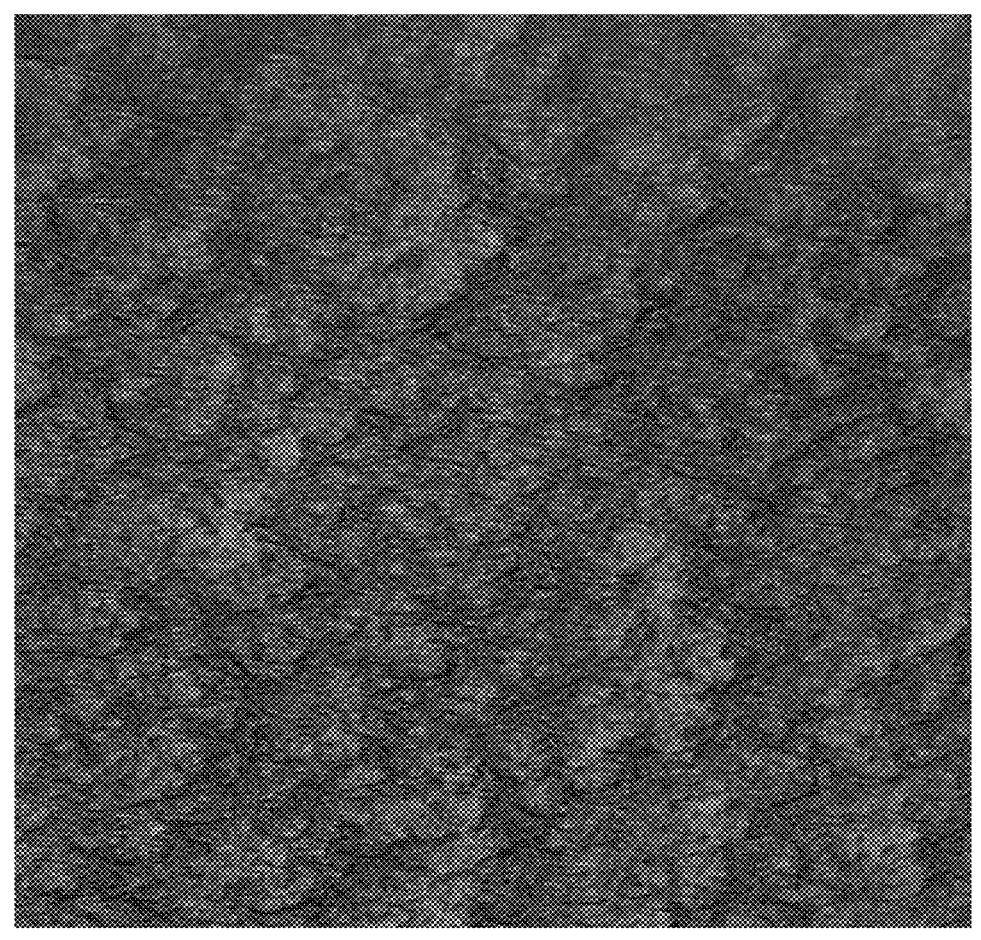
FIG. 2 is a photographic copy illustrating a multilayer pattern effect of a faux wood material according to certain embodiments in the present disclosure.
Figure 3:
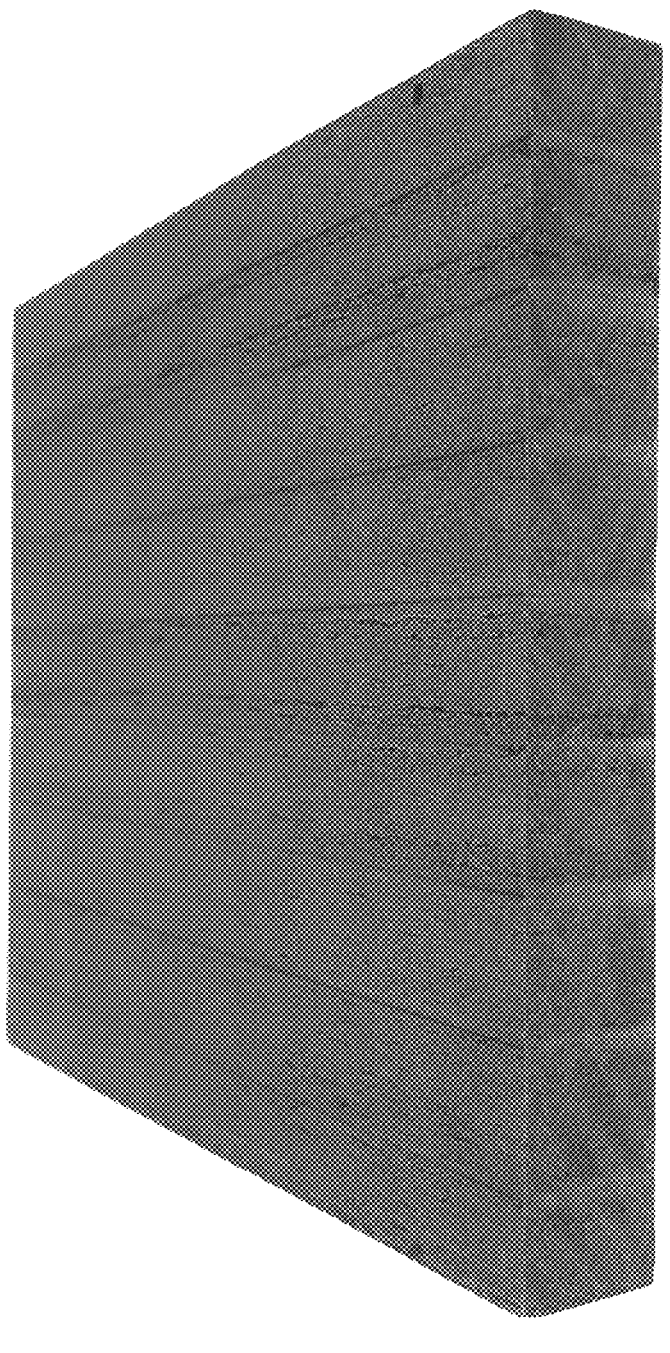
FIG. 3 is a photographic copy illustrating another multilayer pattern effect of a faux wood material according to certain embodiments in the present disclosure.

Referring again to FIG. 1, the method according to the present disclosure is so designed that the first foaming process involves only microcellular foaming to form a preliminary sheet. The first foaming process is intended mainly to provide the preliminary sheet with dark and light colors that are slightly different from each other. More specifically, the forming (i.e., foaming) process of the preliminary sheet gives the two outer sides of the preliminary sheet a relatively high density and hence a relatively dark color, and the same forming process gives the inner area of the preliminary sheet (i.e., the area close to the center of the preliminary sheet) a relatively low density and hence a relatively light color. As a result, two colors that differ in darkness/lightness (that is, two visual effects of the same color that vary in darkness/lightness) are naturally formed. During the second foaming process, the stack of a plurality of preliminary sheets is foamed under a high temperature and high pressure without the colors of each preliminary sheet blending with those of another, and this allows the resulting faux wood material to show a natural multilayer pattern effect as illustrated in FIG. 2 and FIG. 3, which present photos of faux wood materials made according to the present disclosure.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for making a faux wood material with a multilayer pattern effect, comprising:
   performing a compounding process on a thermoplastic elastomer material, a hard-segment-structure material and a foaming agent to form a mixed plastic material;
   performing, through an extruder, a first foaming process on the mixed plastic material to form a preliminary sheet having a density equal to 10% to 20% of a density of the mixed plastic material and a thickness of 1-4 mm;
   stacking a plurality of preliminary sheets including the preliminary sheet up;
   performing, through a hot-pressing mold, a second foaming process on the stacked preliminary sheets until a density of the stacked preliminary sheets is equal to 40%-50% of the density of the mixed plastic material to form the faux wood material, wherein each of the preliminary sheets has two outer sides having a first density and an inner area having a second density different from the first density so that the faux wood material has a multilayer pattern differing in darkness and lightness.

2. The method according to claim 1, wherein the thermoplastic elastomer material comprises at least one of polyethylene, an ethylene-vinyl acetate copolymer, a styrene-butadiene-styrene block copolymer, a styrene-isoprene-styrene block copolymer, and a styrene-based block copolymer.

3. The method according to claim 1, wherein the hard-segment-structure material comprises at least one of polystyrene, a styrene-acrylonitrile copolymer, an acrylonitrile-butadiene-styrene copolymer, and high-impact polystyrene.

4. The method according to claim 1, wherein the thermoplastic elastomer material constitutes 10% to 90% by weight of the mixed plastic material, the foaming agent constitutes 0.1% to 15% by weight of the mixed plastic material, and the hard-segment-structure material makes up the remaining percentage by weight of the mixed plastic material.

5. The method according to claim 1, wherein the foaming agent is an azo-type chemical foaming agent.

6. The method according to claim 1, wherein the foaming agent is a physical foaming agent.

7. The method according to claim 1, wherein an extrusion temperature of the first foaming process is a decomposition temperature of the foaming agent.

8. The method according to claim 1, wherein the second foaming process has a heating temperature of 160-180° C., a pressing pressure of 100-200 kg/cm², and a foaming time of 10-30 minutes.

9. The method according to claim 1, wherein the mixed plastic material further comprises a bridging agent.

10. The method according to claim 9, wherein the bridging agent constitutes 0.01% to 2% by weight of the mixed plastic material.

11. The method according to claim 9, wherein the bridging agent is dicumyl peroxide, 2,5-(tert-butylperoxy)-2,5-dimethylhexane, or sulfur.

12. The method according to claim 1, wherein the mixed plastic material further comprises a coloring material.

13. The method according to claim 1, wherein the mixed plastic material further comprises a fire retardant.

14. The method according to claim 1, wherein the mixed plastic material further comprises a blowing promoter that constitutes 0.1% to 10% by weight of the mixed plastic material.

15. The method according to claim 14, wherein the blowing promoter is zinc stearate or zinc oxide.

* * * * *